(12) United States Patent
Yukawa et al.

(10) Patent No.: US 6,822,851 B2
(45) Date of Patent: Nov. 23, 2004

(54) ELECTRONIC DEVICE

(75) Inventors: Syuhei Yukawa, Tokyo (JP); Akihito Shinohara, Kanagawa (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 10/320,649

(22) Filed: Dec. 17, 2002

(65) Prior Publication Data

US 2003/0156382 A1 Aug. 21, 2003

(30) Foreign Application Priority Data

Dec. 26, 2001 (JP) .................................... 2001-393878

(51) Int. Cl.$^7$ ................................................ G06F 1/16
(52) U.S. Cl. ...................................... 361/679; 361/683
(58) Field of Search ............................... 361/679–683, 361/386, 686

(56) References Cited

U.S. PATENT DOCUMENTS 5,706,168 A * 1/1998 Erler et al. ................. 361/685
5,987,704 A * 11/1999 Tang ........................... 16/354
6,040,978 A * 3/2000 Spencer ...................... 361/683

OTHER PUBLICATIONS

Rooyakkers et al. (US 2001/0007523 A1), "Operator Workstation", Jul. 12, 2001.*

* cited by examiner

*Primary Examiner*—Yean-Hsi Chang
(74) *Attorney, Agent, or Firm*—Oblon, Spivak, McClelland, Maier & Neustadt, P.C.

(57) ABSTRACT

An electronic device which easily offers an optimal operational position taking ergonomics into account without spending time and effort is provided. The electronic device includes a base, a display, an input device, display swing means, and input-device swing means disposed closer to the screen viewing side than the display swing means. The display swing means swingable attaches the display to the base. The input-device swing means swingably attaches the display to the input device. When a tilt angle of the screen of the display increases, a tilt angle of the keyboard increases in accordance with the increase in the tilt angle of the screen.

10 Claims, 9 Drawing Sheets

ELECTRONIC DEVICE

BACKGROUND OF THE INVENTION

1. Field of the Invention

The present invention relates to electronic devices. More particularly, the present invention relates to an electronic device having a display and a keyboard or an input device similar to a keyboard.

2. Description of the Related Art

FIG. 9 illustrates an operational position for an electronic device, typically represented by a personal computer, having a display and a keyboard. In FIG. 9, a display 2 and a keyboard 3 of the personal computer is placed on a working table 1 such as a desk. When an operator 5 sitting in a chair 4 and having a standard sitting height is operating the keyboard 3, it is said that a preferable tilt angle $\theta a$ of the screen of the display 2 lies in the range from about 25 to 30 degrees and a preferable tilt angle $\theta b$ of the keyboard 3 lies in the range from about 5 to 9 degrees when ergonomics (the scientific guideline for on operator to comfortably and easily perform a job) is taken account. The appropriate angle $\theta a$ eases strain on the eyes and neck of the operator 5, and also the appropriate angle $\theta b$ eases strain on his or her wrists.

The tilt angle $\theta a$ is an angle between a line $1a$ orthogonal to the surface of the working table 1 and the screen of the display 2, and the tilt angle $\theta b$ is an angle between a line $1b$ parallel to the surface of the working table 1 and the surface of the keyboard 3.

In order to obtain an appropriate operational position taking ergonomics into account, mechanisms for adjusting the angles $\theta a$ and $\theta b$ are incorporated into the conventional display 2 and keyboard 3. For example, the display 2 has a base $2a$ having a predetermined curved surface along which the display 2 can slide, and the surface of the keyboard 3 is formed in advance so as to be tilted at an angle corresponding to the angle $\theta b$ or the surface is tilted by projections, formed on the bottom surface of the keyboard 3, for adjusting the angle $\theta b$.

However, in the foregoing related arts, since it is required to independently adjust the tilt angles $\theta a$ and $\theta b$ of the corresponding display 2 and keyboard 3, achieving an appropriate position by adjustment is troublesome.

SUMMARY OF THE INVENTION

Accordingly, it is an object of the present invention to provide an electronic device in which tilt angles of a display and a keyboard can be adjusted at the same time, and, as a result, an optimum operational position taking ergonomics into account can be easily obtained without spending time and effort.

An electronic device according to the present invention comprises a base placed on a desk or a working table similar to a desk; a display comprising a screen; an input device; display swing means for swingably attaching the display to the base; and input-device swing means for swingably attaching the input device to the bottom part of the display. The input-device swing means is disposed closer to the screen viewing side than the display swing means.

In the electronic device according to the present invention, the input device is preferably a keyboard and the display may further comprise an arm having a predetermined length and extending from the display swing means to the screen viewing side. Also, the input-device swing means may swingably attach the keyboard to the top of the arm.

In the electronic device according to the present invention, the input-device swing means may comprise a hinge mechanism for attaching the keyboard to the top of the arm. Also, the hinge mechanism may have a structure in which, when the keyboard is in a position to totally or partially cover the screen of the display, the hinge mechanism is in a locked state in which the above position of the keyboard is maintained, and, when the keyboard is in another position different from the above position, the hinge mechanism is in a free state in which the keyboard swings.

In the electronic device according to the present invention, the display may comprise loud speakers at both sides of the screen. Also, when the keyboard is in a position to cover a part of the screen of the display, the loud speakers are preferably disposed above the part of the screen covered by the keyboard.

The electronic device according to the present invention, the keyboard may comprise at least one projection, on the bottom surface thereof, comprising an elastic material having a low sliding resistance in its shear direction.

DESCRIPTION OF THE PREFERRED EMBODIMENT

A preferred embodiment of the present invention, applied to a personal computer by way of example, will be described with reference to the accompanying drawings. It will be apparent to those skilled in the art that various specific details and actual examples, and example numeric values, character strings, and so forth, which will be mentioned in the following description, are intended just for the purpose of reference so as to clarify the spirit of the present invention, and that the present invention is not limited by all or a part of these matters. Also, although the known method, the known procedure, the known circuit, and the like (hereinafter, these are collectively called as the known items) will not be described in detail in order to make the description concise, all or a part of the known items are not intentionally excluded. Since those skilled in the art are aware of these known items when the present invention is applied, the known items will be obviously included in the following description.

Figure 1A:
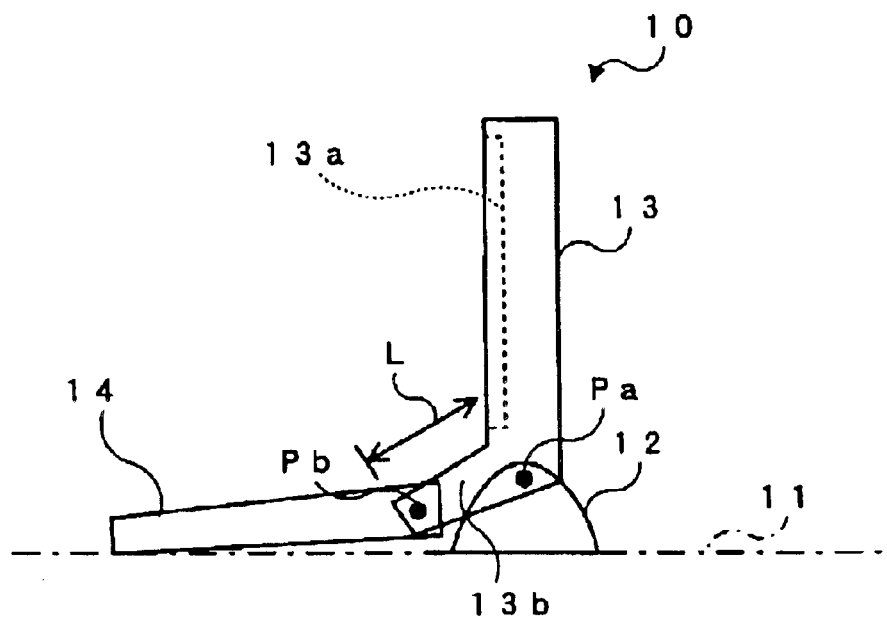
FIGS. 1A and 1B illustrate the principle of an electronic device according to an embodiment of the present invention.

FIG. 1A illustrates the principle of an electronic device according to an embodiment of the present invention. An electronic device 10 according to the present invention includes a base 12 placed on a desk 11 or a working table similar to a desk; a display 13 having a screen 13a and an arm 13b; an input device 14; display swing means Pa for swingably attaching the display 13 to the base 12; and input-device swing means Pb for swingably attaching the input device 14 to the top of the arm 13b of the display 13. The arm 13b has a predetermined length and extends from the display swing means Pa to the screen viewing side. The input-device swing means Pb is disposed closer to the screen viewing side than the display swing means Pa. Although the input device 14 may be any device such as a key input device in which each key is allotted with a corresponding function or a coordinate input device like a pointing device as long as it can input something into the electronic device 10, a keyboard 14 is used in this embodiment.

Figure 1B:
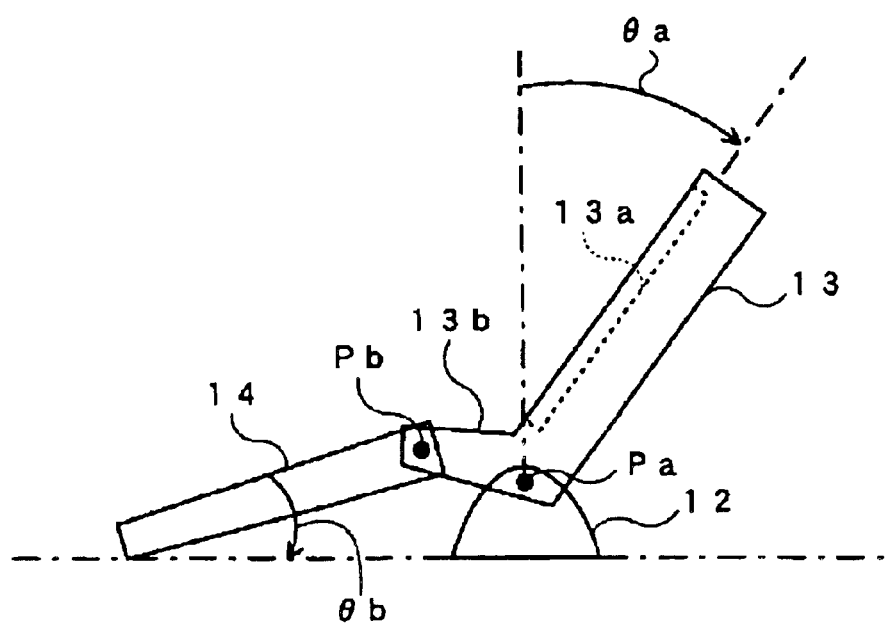

With this structure, as shown in FIG. 1B, a tilt angle θb of the keyboard 14 increases in accordance with an increase in a tilt angle θa of the screen 13a of the display 13, because, as the tilt angle θa of the screen 13a increases, the arm 13b swings about the display swing means Pa and the top position of the arm 13b is shifted upwards, whereby the top of the keyboard 14 attached to the top of the arm 13b is raised. Accordingly, by optimizing the positional relationships between the length L and the direction of the arm 13b and between the top of the arm 13b and the keyboard 14, when the tilt angle θa of the screen 13a is set to lie in the range, for example, from about 25 to 30 degrees, the tilt angle θb of the keyboard 14 can be set to lie in the range from about 5 to 9 degrees, whereby the optimum operational position taking ergonomics into account can be obtained through one operation.

Also, the input-device swing means Pb includes a hinge mechanism for attaching the keyboard 14 to the top of the arm 13b. The hinge mechanism has a structure in which, when the keyboard 14 is in a position to totally or partially cover the screen 13a of the display 13, the hinge mechanism is in a locked state in which the above position of the keyboard 14 is maintained, and, when the keyboard 14 is in another position different from the above position, the hinge mechanism is in a free state in which the keyboard 14 swings.

When the screen 13a of the display 13 is totally or partially covered by the keyboard 14, that is, the keyboard 14 is in an unused, retracted position, the keyboard 14 is locked so as to maintain the retracted position. With this structure, the keyboard 14 does not open automatically due to its own weight or the like, thereby preventing a problem, e.g., at the time of moving the electronic device 10. Also, when the keyboard 14 is in another position different from the retracted position, that is, when the locked state is released and the angle of the display 13 is being changed, since the keyboard 14 is in a free state in which it can swing, the tilt angle θb of the keyboard 14 can be changed in accordance with a change in the tilt angle θa of the screen 13a of the display 13.

Figure 2:
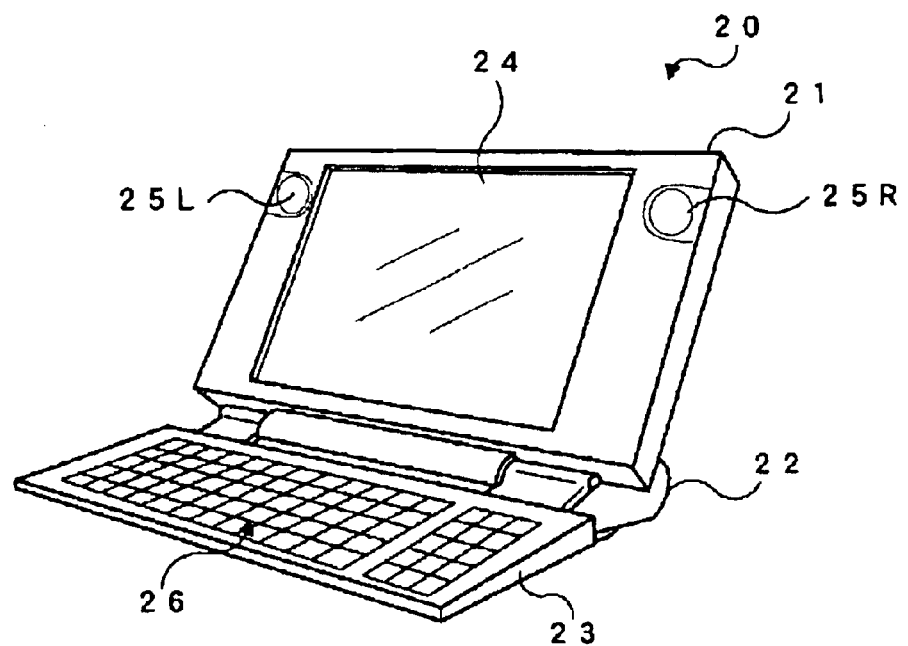
FIG. 2 is an external-perspective view of a personal computer.

FIG. 2 is an external perspective view of a personal computer 20. The personal computer 20 includes a display 21, a base 22, and a keyboard 23. The top of the keyboard 23 is swingably attached to the bottom part of the display 21 via a hinge mechanism (refer to FIGS. 7A and 7B), which will be described later, and, when the personal computer 20 is in an unused state, the keyboard 23 substantially covers the lower half of a screen 21a of the display 21, although this will be described in detail later.

Figure 3A:
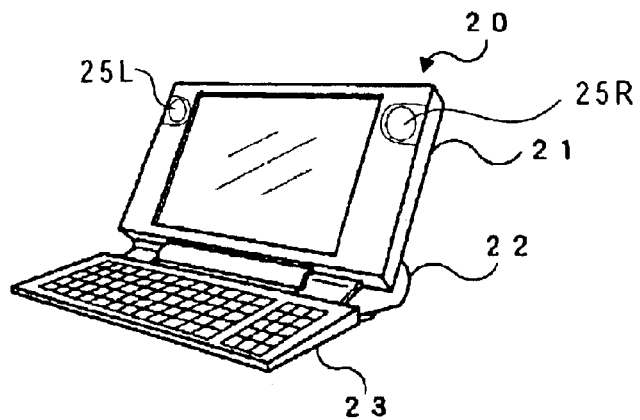
FIGS. 3A to 3C illustrate the opening and closing states of a keyboard.
Figure 3B:
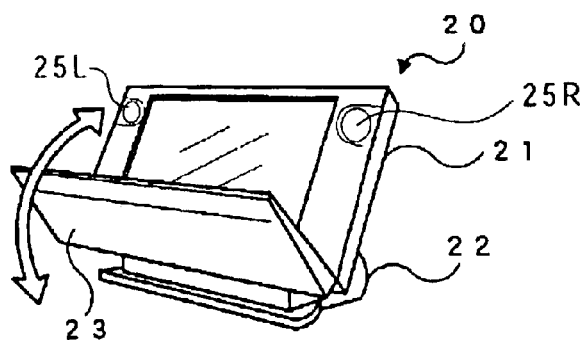
Figure 3C:
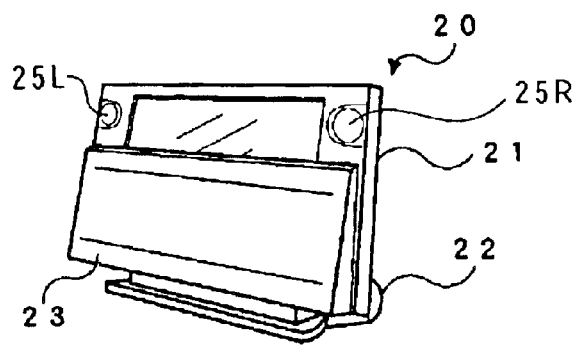

FIGS. 3A to 3C illustrate the opening and closing states of the keyboard 23, wherein FIGS. 3A to 3C illustrate states in which the keyboard 23 is open (hereinafter, called as an open state) so as to perform a key operation, is partially open, and is closed (hereinafter, called as a closed state, a retracted state, or a folded state) so as to prohibit a key operation, respectively.

Although the personal computer 20 shown in these figures further includes a liquid-crystal display panel 24 disposed in the central front part of the display 21 and loud speakers 25R and 25L disposed at both sides of the liquid-crystal display panel 24, and also the keyboard 23 is provided with a full key-top 26 having a predetermined layout, for example, a JIS (Japanese Industrial Standards) keyboard layout, the present invention is not limited to such a keyboard. The present invention is also applicable to electronic devices having a display and a keyboard, for example, (i) a variety of information processing devices such as a word processing dedicated machine, a network terminal, and a workstation, (ii) portable information terminals such as a PDA (personal digital assistant), (iii) portable phones including a car phone and a PHS (personal handy-phone system), and (ix) a variety of dedicated devices used in a measuring instrument such as a spectral analyzer and broadcasting equipment such as a non-linear editor. These devices are in common with the personal computer 20 according to the embodiment with respect to having a display and a keyboard. Although some of these devices are provided with another input device such as a ten-key instead of the keyboard, such an input device can be treated as one type of the keyboards.

Also, the loud speakers 25R and 25L are disposed above a part of the liquid-crystal display panel 24, the part being covered by the keyboard 23, even when the keyboard 23 is in the closed state. Accordingly, the sound of played-back music or the like is not muffled and the best sound quality of the same can be obtained regardless of the opening or closing state of the keyboard 23. In this embodiment, although the loud speakers 25R and 25L are disposed above the part of the display panel 24 covered by the keyboard 23, the loud speakers 25R and 25L may be disposed at any place, as long as the place is not covered by the keyboard 23, for example, on the side surfaces of the display 21.

Figure 4A:
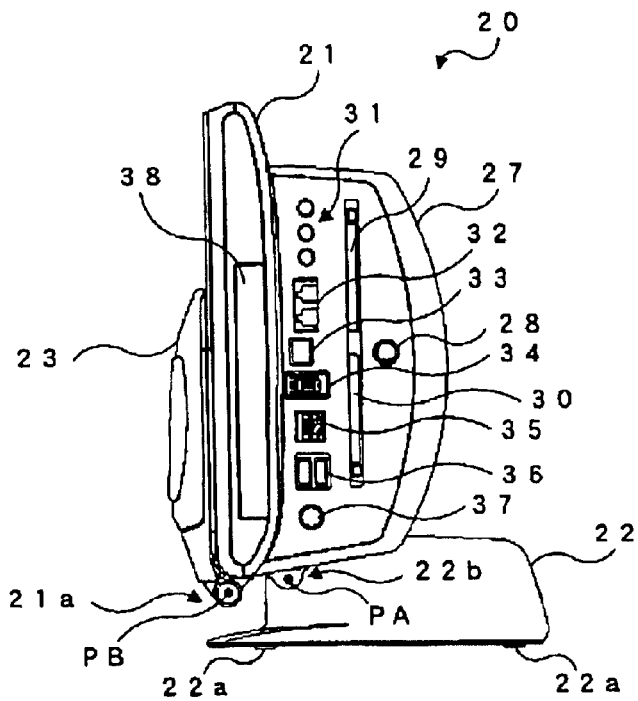
FIGS. 4A and 4B are side views of the personal computer.
Figure 4B:
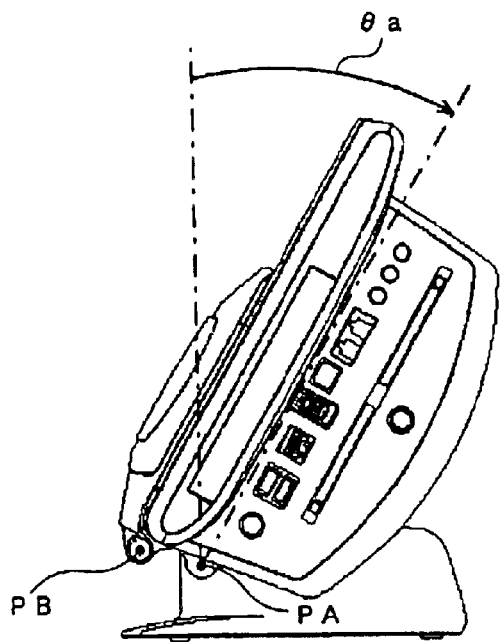

FIGS. 4A and 4B are side views of the personal computer 20. The personal computer 20 still further includes a main body unit 27 integrated with the display 21. The main body unit 27 houses a variety of hardware resources (not shown) such as a mother board and a hard disk.

The main body unit 27 has expansion slots and a variety of connectors disposed on the side surfaces thereof. In FIGS. 4A and 4B shown as an example, the main body unit 27 has an electric power connector 28, PC card slots 29 and 30, an audio connector 31, an IEEE1394 (S400/4 pins) connector 33, an IEEE1394 (S400/6 pins) connector 34, an Ethernet (a registered trademark) connector 35, a UBS connector 36, a mouse connector 37 and so forth disposed on the side surface thereof. Also, the display 21 includes a CD/DVD drive slot disposed on the side surface thereof.

The base 22 has rubber pads 22a attached to the four corners of the bottom surface thereof so as to prevent slippage of the base 22 placed on the desk or the working table (not shown).

The base 22 also has a display support 22b for supporting the display 21 and the main body unit 27. The display support 22b has a swing fulcrum PA at which the display 21 and the main body unit 27 are swingably attached. With this structure, the display 21 and the main body unit 27 can lie in any state, that is, from a standing state (i.e., a state in which the display 21 stands) shown in FIG. 4A to a tilted state (i.e., a state in which the display 21 is tilted) shown in FIG. 4B.

As described above, the angle θa is a tilt angle of the display 21. When the angle θa is zero, the display 21 lies in a standing state and, when the angle θa is greater than zero, the display 21 lies in a tilted state. The appropriate angle θa taking ergonomics into account lies in the range from about 25 to 30 degrees (hereinafter, referred to the ergonomic angle range) and the maximum limitation of the angel θa, over which the display 21 is not allowed to be tilted, is set so as to be slightly over the ergonomic angle range.

The display 21 further includes a keyboard support 21a at the bottom thereof. The keyboard support 21a has the hinge mechanism (refer to FIGS. 7A and 7B) incorporated thereinto, which will be described later. The keyboard support 21a includes a swing fulcrum PB, corresponding to the foregoing top of the arm 13b shown in FIG. 1, at which the keyboard 23 is swingably attached. FIGS. 4A and 4B illustrate a retracted state in which the keyboard 23 is folded and covers the lower half of the display 21.

Figure 5A:
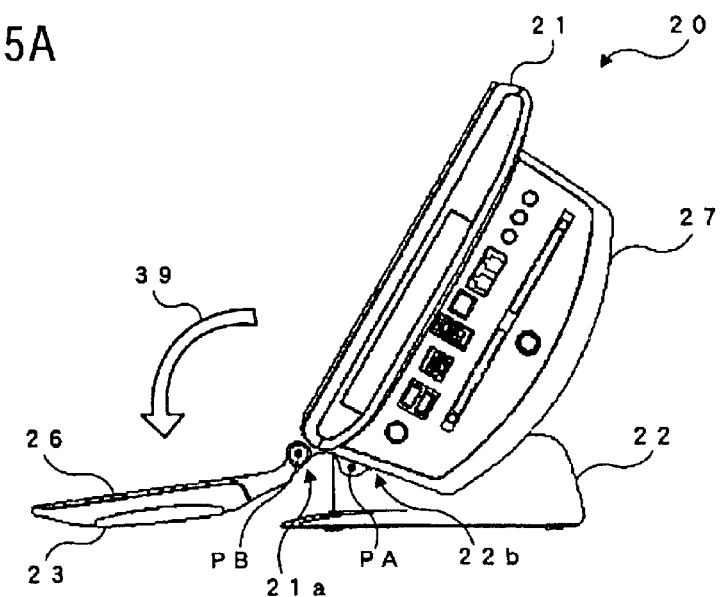
FIG. 5A illustrates the personal computer in which keyboard is opened and FIG. 5B is a side view of the keyboard.

FIG. 5A illustrates a state in which the keyboard 23 is opened by exerting a force thereon in a direction indicated by an arrow 39. In this state, since the full key-top 26 of the keyboard 23 is exposed, a key operation is possible.

Figure 5B:
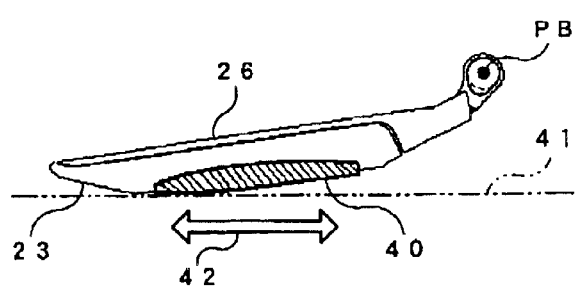

FIG. 5B is a side view of the keyboard 23 having a feature in which a stabilizer 40 composed of a predetermined material is disposed from the side surfaces to the lower surface of the keyboard 23. A part of the stabilizer 40, that is, a part of the lower surface of the keyboard 23, serves as a projection which contacts a desk surface 41 when the keyboard 23 is open. Other parts of the stabilizer 40, that is, parts of the side surfaces of the keyboard 23, serve as handles for opening or closing the keyboard 23. The stabilizer 40 is composed of an elastic material having a low sliding resistance in its shear direction (in a direction indicated by an arrow 42). In other words, a slippery material such as elastomer having a hardness of about 70 can be used.

The low sliding resistance of the projection in the shear direction allows the lower surface of the keyboard 23 to slide smoothly on the desk or the like, whereby the tilt angle θb can be smoothly changed. Also, keying impacts caused by keying the keyboard 23 can be absorbed by the elastic property of the projection.

Next, an operation of adjusting the tilt angles θa and θb of the corresponding display 21 and keyboard 23 will be described.

Figure 6A:
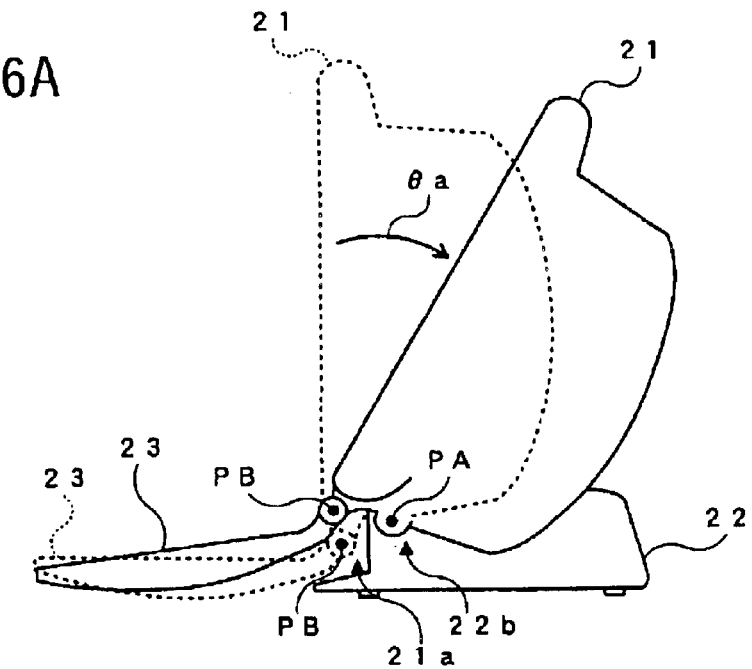
FIGS. 6A and 6B are illustrations of the geometrical relationships between swing fulcrums of a display support and a keyboard support.
Figure 6B:
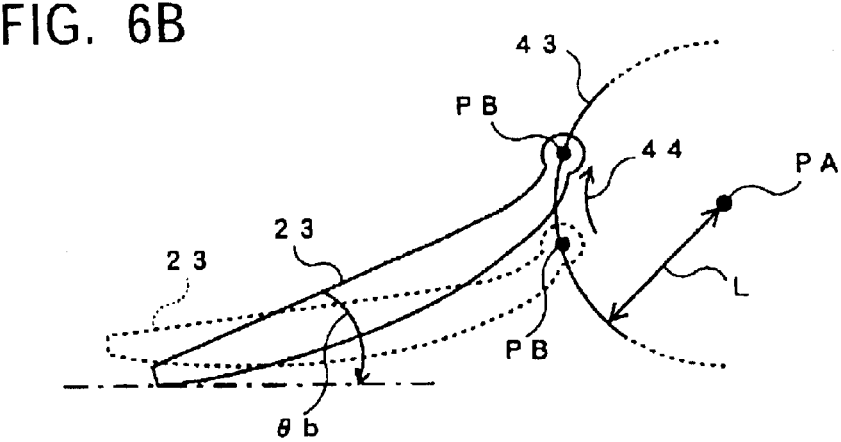

FIGS. 6A and 6B illustrate the geometrical relationships between the swing fulcrums PA and PB of the corresponding display support 22b and keyboard support 21a. In these figures, when the distance between the swing fulcrums PA and PB is defined as L, the swing fulcrum PB of the keyboard support 21a lies always on a circle 43 having its center at the swing fulcrum PA and a radius L corresponding to the length of the arm 13b shown in FIG. 1A.

When the tilt angle θa of the display 21 increases, the swing fulcrum PB of the keyboard support 21a moves clockwise along the circle 43. In FIG. 6B, the swing fulcrum PB moves in a direction indicated by an arrow 44, that is, substantially upwards. Thus, the supported side of the keyboard 23 is raised as the swing fulcrum PB moves substantially upwards, and, as a result, the tilt angle θb of the keyboard 23 increases in accordance with the upward movement of the supported side.

According to this embodiment, when the tilt angle θa of the display 21 is adjusted, the tilt angle θb of the keyboard 23 is adjusted at the same time. Furthermore, by forming the appropriate geometrical relationship between the swing fulcrums PA and PB so that, when the tilt angle θa is set in its ergonomic angle range (from about 25 to 30 degrees), the tilt angle θb is set in its ergonomic angle range (from about 5 to 9 degrees), the two tilt angles θa and θb can be optimized through one operation.

Subsequently, the hinge mechanism will be described.

Figure 7A:
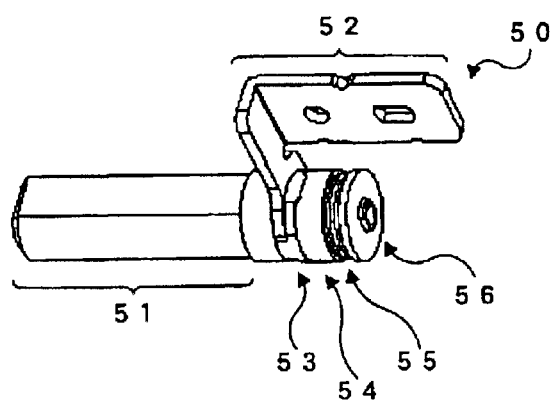
FIGS. 7A and 7B are an external view and an exploded view of a hinge mechanism.
Figure 7B:
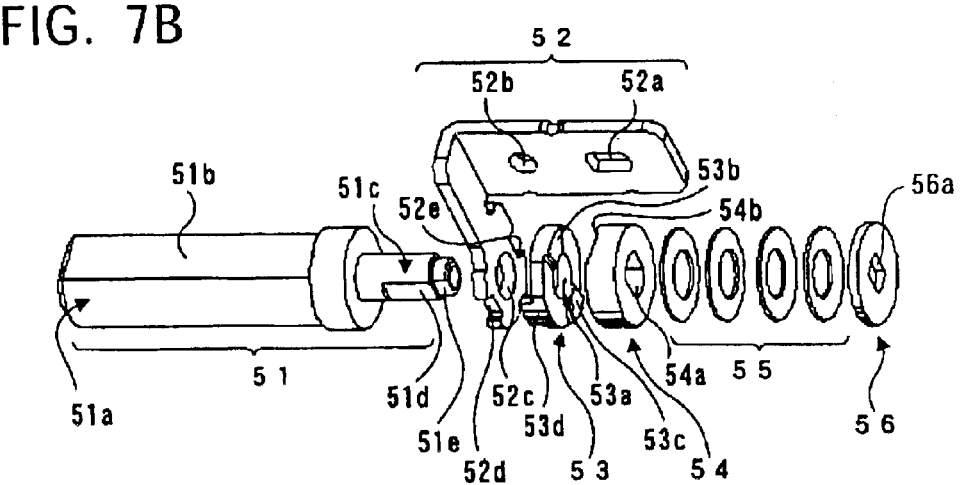

FIGS. 7A and 7B illustrate an external view and an exploded view of a hinge mechanism 50. The hinge mechanism 50 has a flange 51, a bracket 52, a first engaging piece 53, a second engaging piece 54, a plurality of leaf springs 55, a presser plate 56, and so forth.

The flange 51 has a cylindrical body 51a for press-fitting the flange 51 into the keyboard 23. Since the cylindrical body 51a has flat surfaces 51b formed on its circumferential surface along the longitudinal direction thereof, the keyboard 23 and the flange 51 are integrated when the flange 51 is press-fitted into the keyboard 23. The flange 51 has a cylindrical projection 51c coaxially formed at one end thereof. The cylindrical projection 51c has flat surfaces 51d formed on its circumferential surface and a projection 51e, having an approximately rectangular cross section, formed at the top thereof.

The bracket 52 is formed by a metal plate. The plate has bolt holes 52a and 52b, a flange attaching hole 52c, and engaging depressions 52d and 52e. The positions, the number, and the mutual distance of the bolt holes 52a and 52b are set so as to agree with those of bolt holes (not shown) of the display 21. In FIG. 7B, two bolt holes are illustrated by way of example. The flange attaching hole 52c is approximately round and has an inner diameter slightly greater than the outer diameter of the cylindrical projection 51c. The engaging depressions 52d and 52e are cuts formed at two parts of the plate outside the flange attaching hole 52c and are used to regulate the rotation of the first engaging piece 53, which will be described below.

The cylindrical first engaging piece 53 has a coaxial, round hole 53a, two protrusions 53b and 53c on its right surface, and two projections 53d (one of them is not seen in the figure) on its left surface. The round hole 53a has an inner diameter slightly greater than the outer diameter of the cylindrical projection 51c of the flange 51. The positions and the sizes of the projections 53d are set so as to agree with those of the engaging depressions 52d and 52e of the bracket 52.

The cylindrical second engaging piece 54 has a coaxial, approximately rectangular hole 54a and two dents 54b (one of them is not seen in the figure) on its left surface. The approximately rectangular hole 54a of the second engaging piece 54 has a shape so as to agree with the cross-sectional shape of the front portion, having the flat surfaces 51d formed on its circumferential surface, of the cylindrical projection 51c of the flange 51.

The leaf springs 55 are used to exert a predetermined spring force in the depth direction thereof. When a spring force of each leaf spring 55 is F and the number of the leaf springs 55 is n, the total spring force of F×n is exerted by the leaf springs 55. Each of the leaf springs 55 may have a different spring force from each other instead of the same spring force. For example, in the case of n=4, the four leaf springs 55 may have respective spring forces F1, F2, F3, and F4. In this case, the total spring force is obtained by summing up the forces F1 to F4. Although coil springs may be used instead of leaf springs, the leaf springs are preferable since the total spring force can be easily adjusted by changing the number of the leaf springs.

The round presser plate 56 has a coaxial, approximately rectangular hole 56a. The approximately rectangular hole 56a has a shape so as to agree with the cross-sectional shape of the projection 51e, having a approximately rectangular cross section, formed at the top of the cylindrical projection 51c of the of the flange 51. The presser plate 56 and the flange 51 are engaged with each other and fixed to each other by swaging, with a bolt, or the like.

The hinge mechanism 50 having the above-described structure is assembled as described below. Firstly, the cylindrical projection 51c of the flange 51 is inserted into the flange attaching hole 52c of the bracket 52 and the round hole 53a of the first engaging piece 53, and then the first engaging piece 53 is turned for a necessary angle so as to engage the two projections 53d of the first engaging piece 53 with the engaging depressions 52d and 52e of the bracket 52. In this stage, the bracket 52 rotates freely from the flange 51, while rotating together with the first engaging piece 53.

Next, the cylindrical projection 51c of the flange 51 is inserted into the approximately rectangular hole 54a of the second engaging piece 54. Since the approximately rectangular hole 54a of the second engaging piece 54 has a shape so as to agree with the cross-sectional shape of the front portion, having the flat surfaces 51d formed on its circumferential surface, of the cylindrical projection 51c of the flange 51, the relative rotation of the flange 51 and the second engaging piece 54 are regulated. That is, the second engaging piece 54 is allowed to move in its axial direction and regulated to rotate about its axis with respect to the flange 51.

After the above-described assembling, lastly, the cylindrical projection 51c of the flange 51 is inserted into the leaf springs 55 and the presser plate 56, and then the top (i.e., the projection 51e having an approximately rectangular cross section) of the cylindrical projection 51c of the flange 51 and the presser plate 56 are fixed to each other by swaging, with a bolt, or the like, while compressing the leaf springs 55 with the presser plate 56, thus leading to completion of the hinge mechanism 50.

With the hinge mechanism 50 having the above-described structure, the keyboard 23 is attached to the flange 51 and the bracket 52 is fixed to the display 21. With this arrangement, the relative rotational movement between the flange 51 and the bracket 52 allows an opening or closing operation of the keyboard 23 (refer to FIGS. 3A and 3B).

The first engaging piece 53 of the hinge mechanism 50 rotates together with the bracket 52 and also the second engaging piece 54 rotates together with the flange 51. That is, the relative rotational movement between the first and second engaging pieces 53 and 54 is in short a rotational movement accompanied by the opening or closing operation of the keyboard 23 (refer to FIGS. 3A and 3B).

Figure 8A:
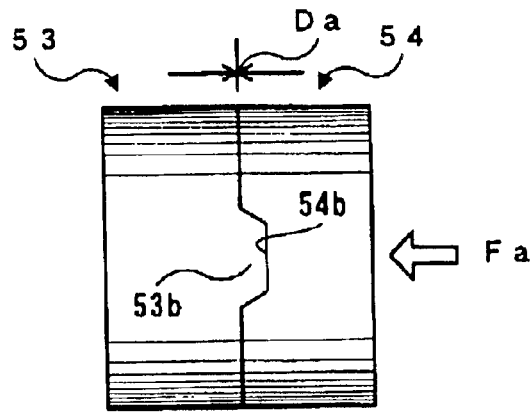
FIGS. 8A to 8C illustrate the relative rotational movement of first and second engaging pieces.
Figure 8B:
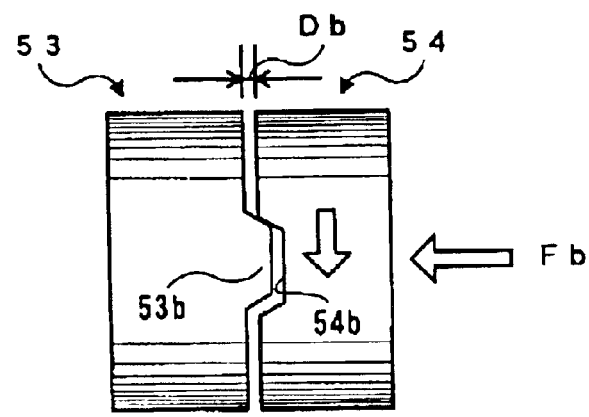
Figure 8C:
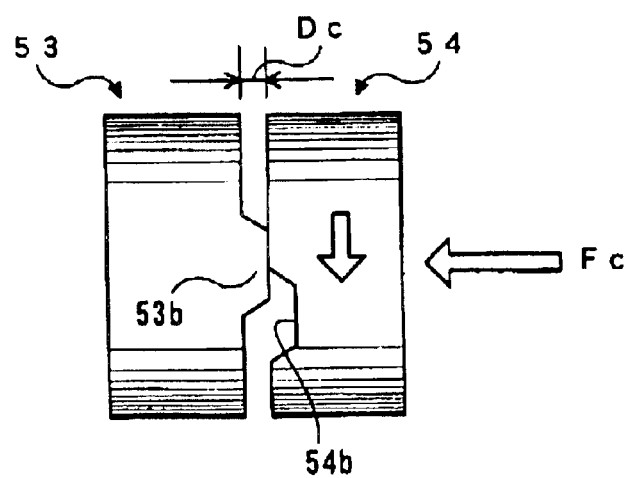
Figure 9:
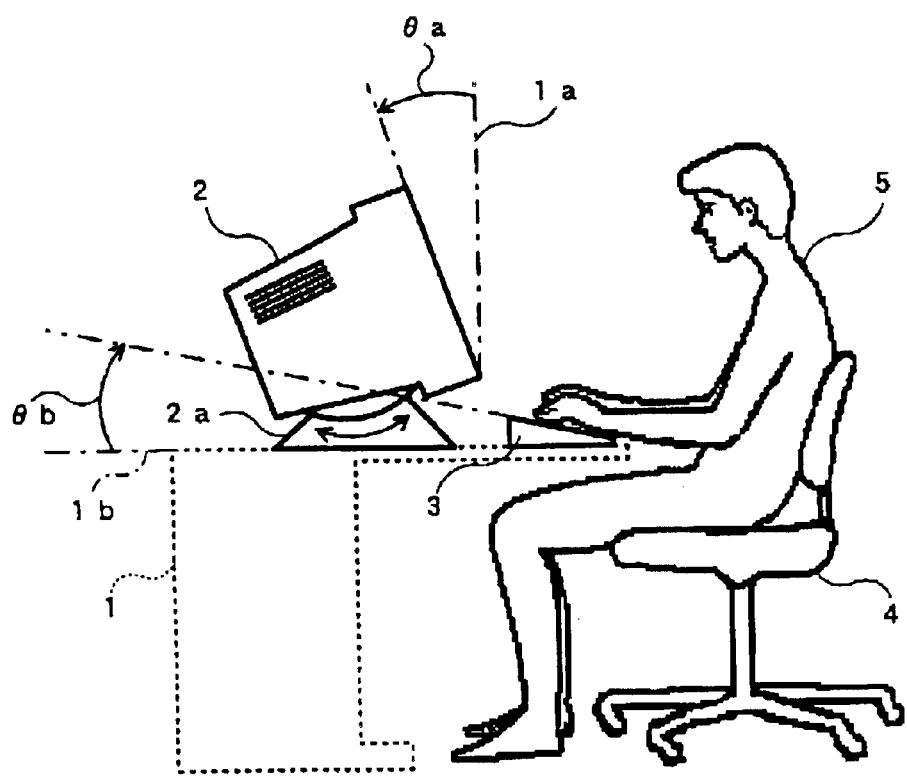
FIG. 9 is an illustration of an operational position taking ergonomics into account.

FIGS. 8A to 8C are schematic views illustrating the relative rotational movement between the first and second engaging pieces 53 and 54.

FIG. 8A illustrates a state in which the protrusion 53b of the first engaging piece 53 and the dent 54b of the second engaging piece 54 are engaged with each other (an engaging state). In this state, a gap Da between the first and second engaging pieces 53 and 54 is almost zero and thus a spring force Fa exerted from the leaf springs 55 is minimal.

In order to release this engaging state by producing the relative rotational movement between the first and second engaging pieces 53 and 54, the dent 54b must climb over the protrusion 53b, as shown in FIG. 7B illustrating a transitional state in which the dent 54b is on the mid-way of climbing over the protrusion 53b. In this state, a gap Db between the first and second engaging pieces 53 and 54 widens and thus a spring force Fb exerted from the leaf springs 55 increases. That is, in order to release the foregoing engaging state, exerting an external force overcoming the spring force Fb is required.

Accordingly, by arranging the keyboard 23 so as to be in the closed state when the first and second engaging pieces 53 and 54 are in the engaging state, the closed state is maintained as long as the foregoing external force is not exerted, thereby achieving a so-called locked state. This structure prevents a problem in which the keyboard 23 opens automatically, for example, at the time of moving the personal computer 20.

As shown in FIG. 8C, in a state in which the protrusion 53b and the dent 54b are completely released from the engaging state, a gap Dc between the first and second engaging pieces 53 and 54 is maximal and thus a spring force Fc exerted from the leaf springs 55 is maximal. In this state, by setting the spring force Fc nearly equal to or slightly smaller than the weight of the keyboard 23, the tilt angle θb of the keyboard 23 can be changed in accordance with the change in the tilt angle θa of the display 21.

As described above, the personal computer 20 according to the embodiment of the present invention has the following features and advantages.

(1) Since, when the tilt angle θa of the display 21 is changed, the tilt angle θb of the keyboard 23 is changed at the same time, the two tilt angles θa and θb are not required to be independently adjusted as in a conventional way, thereby providing a special advantage in which the operational position of the personal computer 20 can be set through one operation.

(2) Since, when the tilt angle θa is set in its ergonomic angle range (from about 25 to 30 degrees), the tilt angle θb is also set in its ergonomic angle range (from about 5 to 9 degrees), the two tilt angles θa and θb can be optimized through one operation, thereby easily achieving an optimal operational position at which an operator does not feel tired and which causes less strain on the eyes and the shoulders of the operator.

(3) Since the locked state of the hinge 50 (the state in which the protrusions 53b and the dents 54b are engaged with each other) is associated with the closed state of the keyboard 23, the closed state of the keyboard 23 can be maintained, thereby preventing the keyboard 23 from opening automatically, for example, at the time of moving the personal computer 20.

(4) Since the total spring force of the leaf springs 55 at the time of releasing the locked state of the hinge mechanism 50 is set to have an appropriate value (for, example, nearly equal to or slightly smaller than the weight of the display 21), the tilt angle θb of the keyboard 23 can be changed in accordance with the change in the tilt angle θa of the display 21.

(5) Since, when the display 21 has the loud speakers 25R and 25L on the both sides of the screen 21a and the keyboard 23 is in a position to cover a part of the screen 21a, the loud speakers 25R and 25L are disposed above the part of the screen 21a, whereby the sound of played-back music or the like is not muffled and the best sound quality of the same can be obtained.

(6) Since the stabilizer 40 composed of a predetermined elastic material having a low sliding resistance in its shear direction is disposed from the side surfaces to the lower surface of the keyboard 23, the stabilizer 40 allows the keyboard 23 to slide smoothly on the desk surface 41, whereby the tilt angle θb of the keyboard 23 can be smoothly changed and also keying impacts caused by keying the keyboard 23 can be absorbed. In addition, the stabilizer 40 can be used as handles for opening or closing the keyboard 23.

As described above, according to the present invention, the input device can be set at its optimal operational position taking ergonomics into account through one operation.

Also, according to the present invention, the input device is prevented from opening, for example, at the time of moving the electronic device. In addition, the tilt angle of the input device can be changed in accordance with the tilt angle of the screen of the display. Furthermore, keying impacts caused by keying the input device can be absorbed.

What is claimed is:

1. An electronic device comprising:

a base;

a display comprising a screen;

an input device;

display swing means for swingably attaching the display to the base; and input-device swing means for swingably attaching the input device to a bottom part of the display, said input-device swing means configured to position said input device at a range of angles with respect to said base.

2. The electronic device according to claim 1, wherein:

the input device is a keyboard, and the display further comprises an arm having a predetermined length and extending from the display swing means to a front of the screen, and the input-device swing means swingably attaches the keyboard to a top of the arm.

3. The electronic device according to claim 2, wherein:

the input-device swing means comprises a hinge mechanism for attaching the keyboard to the top of the arm, and the hinge mechanism has a structure in which, when the keyboard is in a first position to totally or partially cover the screen of the display, the hinge mechanism is in a locked state in which the first position of the keyboard is maintained, and, when the keyboard is in a second position, the hinge mechanism is in a free state in which the keyboard swings.

4. The electronic device according to claim 3, wherein:

the display comprises loud speakers at both sides of the screen, and when the keyboard is in a position to cover a part of the screen of the display, the loud speakers are disposed above the part of the screen covered by the keyboard.

5. The electronic device according to claim 1, wherein the keyboard comprises at least one projection on a bottom surface thereof, the projection comprising an elastic material having a low sliding resistance in its shear direction.

6. An electronic device comprising:

a base;

a display comprising a screen;

an input device;

a display swing element configured to swingably attach the display to the base; and an input-device swing element configured to swingably attach the input device to a bottom part of the display, said input-device swing element configured to position said input device at a range of angles with respect to said base.

7. The electronic device according to claim 6, wherein:

the input device is a keyboard, and the display further comprises an arm having a predetermined length and extending from the display swing element to a front of the screen, and the input-device swing element is configured to swingably attach the keyboard to a top of the arm.

8. The electronic device according to claim 7, wherein:

the input-device swing element comprises a hinge mechanism that attaches the keyboard to the top of the arm, and the hinge mechanism has a structure in which, when the keyboard is in a first position to totally or partially cover the screen of the display, the hinge mechanism is in a locked state in which the first position of the keyboard is maintained, and, when the keyboard is in a second position, the hinge mechanism is in a free state in which the keyboard swings.

9. The electronic device according to claim 8, wherein:

the display comprises loud speakers disposed at both sides of the screen, and when the keyboard is positioned to cover a part of the screen of the display, the loud speakers are disposed above the part of the screen covered by the keyboard.

10. The electronic device according to claim 6, wherein the keyboard comprises at least one projection on a bottom surface thereof, the projection including an elastic material having a low sliding resistance in its shear direction.

* * * * *